(12) United States Patent
Ivey et al.

(10) Patent No.: US 8,571,716 B2
(45) Date of Patent: *Oct. 29, 2013

(54) INTEGRATION OF LED LIGHTING WITH BUILDING CONTROLS

(75) Inventors: John Ivey, Farmington Hills, MI (US); David L Simon, Grosse Pointe Woods, MI (US)

(73) Assignee: iLumisys, Inc., Troy, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/491,961

(22) Filed: Jun. 8, 2012

(65) Prior Publication Data

US 2012/0248991 A1    Oct. 4, 2012

Related U.S. Application Data

(63) Continuation of application No. 12/572,601, filed on Oct. 2, 2009, now Pat. No. 8,214,084.

(60) Provisional application No. 61/108,358, filed on Oct. 24, 2008.

(51) Int. Cl.
*H05B 37/02*    (2006.01)

(52) U.S. Cl.
USPC .......................... 700/275; 315/291; 315/308

(58) Field of Classification Search
USPC ......... 700/275, 276, 277, 291, 295, 296, 297; 315/291, 307, 308, 315; 362/234, 253, 362/276; 398/183; 340/815.45
See application file for complete search history.

(56) References Cited

U.S. PATENT DOCUMENTS

| | | | | |
|---|---|---|---|---|
| 5,909,378 | A  * | 6/1999 | De Milleville | 700/276 |
| 7,498,753 | B2 * | 3/2009 | McAvoy et al. | 315/291 |
| 7,583,901 | B2 * | 9/2009 | Nakagawa et al. | 398/183 |
| 7,598,681 | B2 * | 10/2009 | Lys et al. | 315/291 |
| 7,598,684 | B2 * | 10/2009 | Lys et al. | 315/307 |
| 8,214,084 | B2 * | 7/2012 | Ivey et al. | 700/275 |
| 2002/0153851 | A1 * | 10/2002 | Morgan et al. | 315/291 |
| 2005/0162101 | A1 * | 7/2005 | Leong et al. | 315/291 |
| 2005/0281030 | A1 * | 12/2005 | Leong et al. | 362/234 |
| 2006/0056855 | A1 * | 3/2006 | Nakagawa et al. | 398/183 |
| 2007/0229250 | A1 * | 10/2007 | Recker et al. | 340/531 |
| 2008/0012502 | A1 * | 1/2008 | Lys | 315/247 |
| 2009/0085500 | A1 * | 4/2009 | Zampini et al. | 315/297 |
| 2009/0284169 | A1 * | 11/2009 | Valois | 315/291 |

* cited by examiner

*Primary Examiner* — Charles Kasenge
(74) *Attorney, Agent, or Firm* — Young Basile

(57) ABSTRACT

An LED-based light can be installed in a conventional light fixture. The LED-based light can include a sensor operable to output a first signal indicative of whether an area of one or more of the rooms is in an occupied state or a non-occupied state, and the LED-based light can also include an LED controller operable to control at least one LED in the light in response to the first signal. Additionally, the LED-based light can include a transmitter operable to output a second signal indicative of whether the area is in the occupied state or the non-occupied state to a building environment regulator.

14 Claims, 1 Drawing Sheet

INTEGRATION OF LED LIGHTING WITH BUILDING CONTROLS

STATEMENT OF RELATED CASES

The present application is a continuation of U.S. patent application Ser. No. 12/572,601, filed Oct. 2, 2009, which in turn claims priority from U.S. Provisional Patent Application Ser. No. 61/108,358, filed Oct. 24, 2008, both of which are incorporated by reference herein in their entireties.

FIELD

An LED-based light as described herein relates to "smart buildings" that can automatically control various environmental characteristics of one or more rooms in a building.

BACKGROUND

Buildings typically include various systems for controlling conditions inside the buildings, such as heating, ventilating, and air conditioning (HVAC) systems and lighting systems. HVAC systems and lighting systems generally operate independent from one another. For example, a thermostat can be set to control operation of an HVAC system, while a lighting system can be turned on and off using a wall-mounted switch.

SUMMARY

Known smart buildings that can automatically control various environmental characteristics of one or more rooms of a building are typically expensive to manufacture and install. For example, known smart building components typically are not compatible with standard building fixtures, such as conventional fluorescent tube fixtures, and thus can require an electrician to install.

Examples of LED-based lights described herein can be used to transform a building with standard fixtures, such as standard fluorescent tube fixtures, into a smart building. Many advantages are offered by the LED-based lights described herein, such as allowing for a low-cost smart building.

Examples of systems for use in conjunction with a conventional light fixture that are configured to receive a standardized electrical connector of a conventional light are described herein. In one such example, the system includes a sensor operable to output a first signal indicative of whether an area in a building is in an occupied state or a non-occupied state and an LED-based light. The LED-based light includes at least one electrical connector compatible with the conventional light fixture, at least one LED, an LED controller operable to control the at least one LED in response to the first signal, and a transmitter operable to transmit a second signal indicative of whether the area is in the occupied state or the non-occupied state to the regulator controller. The system also includes a regulator controller remote from the LED-based light and is operable to control an environmental condition in the building in response to the second signal.

Examples of LED-based lights compatible with a standard light fixture are also described herein. In one such example, the LED-based light includes a tube including a light transmitting portion, a pair of electrical connectors attached to opposing ends of the tube, the pair of electrical connectors compatible with the standard fluorescent light fixture; at least one LED operable to produce light that passes through the light transmitting portion of the tube; a sensor operable to output a first signal indicative of whether one or rooms in a building is in an occupied state or a non-occupied state; an LED controller operable to control the at least one LED in response to the first signal, and a transmitter operable to output a second signal indicative of whether the area is in the occupied state or the non-occupied state to a regulator controller remote from the LED-based light and operable to control at least one function in the building in response to the second signal, wherein the at least one function is other than controlling the LED-based light.

Examples of methods for controlling an environmental condition in a building using an LED-based light including at least one electrical connector compatible with a conventional light fixture and at least one LED are also disclosed herein. In one such example, the method includes outputting a first signal indicative of whether an area in a building is in an occupied state or a non-occupied state and controlling the at least one LED in response to the first signal. The method also includes transmitting a second signal indicative of whether the area is in the occupied state or the non-occupied state to a location remote from the LED-based light and controlling at least one function in the building in response to the second signal, wherein the at least one function is other than controlling the LED-based light.

These and other examples will be described in additional detail hereafter.

DESCRIPTION

Figure 1:
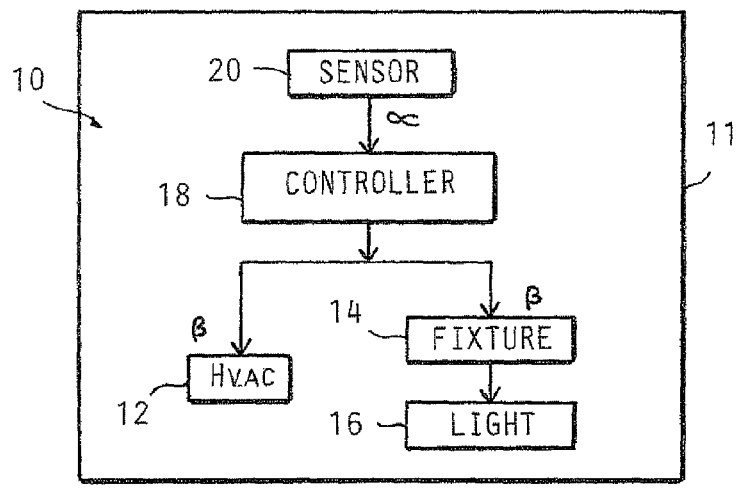
FIG. 1 is a schematic diagram of a smart building system.

FIGS. 1-4 show components of smart building systems. As shown in FIG. 1, a smart building system 10 for use in a building 11 can include an HVAC system 12, a light fixture 14, an LED-based light 16, a controller 18, and one or more sensors 20. The HVAC system 12 can include known HVAC components, such as a heater, an air conditioner, fans, a thermostat, and ductwork. The HVAC system 12 can regulate the temperature, humidity, and/or other air quality considerations in one or more rooms of the building 11. For example, the HVAC system 12 can maintain the temperature in one or more rooms of the building 11 at a level near a setpoint temperature input to the thermostat. The HVAC system 12 can also be capable of controlling airflow between the building 11 and the environment surrounding the building 11, such as by opening or closing vents, windows, skylights, and other barriers between the building 11 and the surrounding environment. In addition or alternative to the HVAC system 12, the smart building system 10 can include another type of temperature control system (e.g., a control for heated floors), another type of light control system (e.g., a control for window shades or dynamically tinted windows), or some other control for the building 11. The HVAC system 12 can be in communication with the controller 18 as is described below in greater detail.

The light fixture 14 can be designed to accept standard fluorescent tubes, such as a T-5, T-8, or T-12 fluorescent tube, or other standard sized light, such as incandescent bulbs. Alternatively, the fixture 14 can be designed to accept non-standard sized lights, such as lights installed by an electrician.

Additionally, the fixture 14 can include one or more fixtures. The fixture 14 can be in communication with the controller 18 for controlling the operation of the light 16 as is described below in greater detail.

Figure 2:
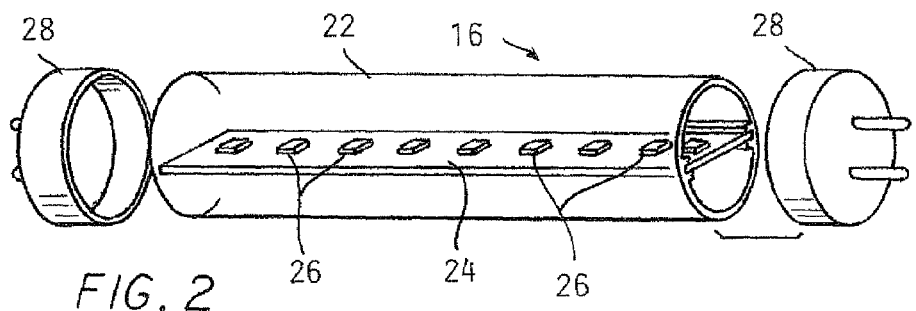
FIG. 2 is a perspective view of an example of an LED light tube.

The LED light tube 16 can include a housing 22, a circuit board 24, LEDs 26, and a pair of end caps 28 as shown in FIG. 2. The housing 22 as shown in FIG. 2 is light transmitting and has the shape of a cylindrical tube. The housing 22 can be made from polycarbonate, acrylic, glass or another light transmitting material (i.e., the housing 22 can be transparent or translucent). For example, a translucent housing 22 can be made from a composite, such as polycarbonate with particles of a light refracting material interspersed in the polycarbonate. While the illustrated housing 22 is cylindrical, housings having a square, triangular, polygonal, or other cross sectional shape can alternatively be used. Similarly, while the illustrated housing 22 is linear, housings having an alternative shape, e.g., a U-shape or a circular shape can alternatively be used. Additionally, the housing 22 need not be a single piece as shown in FIG. 2. Instead, another example of a housing can be formed by attaching multiple individual parts, not all of which need be light transmitting. For example, such a housing can include an opaque lower portion and a lens or other transparent cover attached to the lower portion to cover the LEDs 26. The housing 22 can be manufactured to include light diffusing or refracting properties, such as by surface roughening or applying a diffusing film to the housing 22. For compatibility with the fixture 14 as discussed above, the housing 22 can have a length such that the light 16 is approximately 48" long, and the housing 22 can have a 0.625", 1.0", or 1.5" diameter.

The circuit board 24 as illustrated in FIG. 2 is an elongate printed circuit board. Multiple circuit board sections can be joined by bridge connectors to create the circuit board 24. The circuit board 24 as shown in FIG. 2 is slidably engaged with the housing 22, though the circuit board 24 can alternatively be clipped, adhered, snap- or friction-fit, screwed or otherwise connected to the housing 22. For example, the circuit board 24 can be mounted on a heat sink that is attached to the housing 22. Also, other types of circuit boards may be used, such as a metal core circuit board. Or, instead of a circuit board 24, other types of electrical connections (e.g., wires) can be used to electrically connect the LEDs 26 to a power source.

The light 16 can include two bi-pin end caps 28 (i.e., each end cap 28 can carry two pins), one at each longitudinal end of the housing 22, for physically and electrically connecting the light 16 to the fixture 14. The end caps 28 can be the sole physical connection between the light 16 and the fixture 14. The end caps 28 can be electrically connected to the circuit board 24 to provide power to the LEDs 26. Each end cap 28 can include two pins, though two of the total four pins can be "dummy pins" that do not provide an electrical connection. Alternatively, other types of electrical connectors can be used, such as an end cap carrying a single pin. Also, while the end caps 28 are shown as including cup-shaped bodies, the end caps 28 can have a different configuration (e.g., the end caps 28 can be shaped to be press fit into the housing 22). One or both of the end caps 28 can additionally include electric components, such as a rectifier and filter.

The LEDs 26 can be surface-mount devices of a type available from Nichia, though other types of LEDs can alternatively be used. For example, although surface-mounted LEDs 26 are shown, one or more organic LEDs can be used in place of or in addition thereto. The LEDs 26 can be mounted to the circuit board 24 by solder, a snap-fit connection, or other means. The LEDs 26 can produce white light. However, LEDs that produce blue light, ultra-violet light or other wavelengths of light can be used in place of white light emitting LEDs 26.

The number of LEDs 26 can be a function of the desired power of the light 16 and the power of the LEDs 26. For a 48" light, such as the light 16, the number of LEDs 26 can vary from about five to four hundred such that the light 16 outputs approximately 500 to 3,000 lumens. However, a different number of LEDs 26 can alternatively be used, and the light 16 can output a different amount of lumens. The LEDs 26 can be evenly spaced along the circuit board 24, and the spacing of the LEDs 26 can be determined based on, for example, the light distribution of each LED 26 and the number of LEDs 26.

While the light 16 is shown as being compatible with standard sized fluorescent fixtures, an LED-based light having another shape, such as an incandescent bulb or another type of light, can alternatively be used. Also, other types of light sources, such as fluorescent or incandescent based light sources, can be used instead of the LEDs 26.

Referring again to FIG. 1, the controller 18 can include a memory and a CPU for executing a program stored on the memory. The controller 18 can be in communication with the sensor 20 for receiving a detection signal α from the sensor 20 as is described below in greater detail. Additionally, the controller 18 can be in communication with the HVAC system 12 and fixture 14 for controlling operation of the HVAC system 12 and the output of the light 16. For example, the controller 18 can be in communication with the various components of the HVAC system 12 for controlling their respective operation, and the controller 18 can further control the amount of power supplied by the fixture 14 to the light 16. Also, the controller 18 can include multiple controllers, such as a controller for a heating portion of the HVAC system 12, another controller for a ventilation portion of the HVAC system, and yet another controller coupled to the fixture 14 for controlling the amount of power supplied to the light 16.

The sensor 20 can include a motion sensor, a sensor for determining whether a door is ajar, a sensor for determining when a keypad or other type of lock is actuated, a voice-activated sensor, a clock or calendar, an ambient light sensor, a power supply monitor, and/or another type of sensor. The sensor 20 can include multiple types of sensors for detecting different types of activities (e.g., the sensor 20 can include a clock and a motion sensor). Additionally, the sensor 20 can include multiple sensors in different rooms or spaces of the building 11.

In operation, the sensor 20 can perform detection and, in response, send the detection signal α to the controller 18. The detection signal α can indicate whether the building 11 is in an occupied state or an unoccupied state. For example, if the sensor 20 includes a motion detector, the sensor 20 can send the detection signal α to the controller 18 to indicate the building is in the occupied state when motion is detected. The sensor 20 can continuously send the detection signal α to the controller 18, or the sensor 20 can send the detection signal α only when a positive detection (e.g., an indication that the building is in the occupied state) occurs. The detection signal α can also indicate that the building is in the unoccupied state when, for example, a predetermined amount of time has passed since a positive detection last occurred, or when the sensor 20 includes a clock and the time is past normal working hours. Also, the detection signal α can include signals from multiple types of sensors making up the sensor 20, such as a voice-activated sensor, a motion sensor, and a clock. If the controller 18 receives signals from multiple sensors 20 in different locations, the detection signal α can include a location of the detection (e.g., a specific room or area of the building 11).

Also in operation, the controller 18 can control the function of the HVAC system 12 and the light 16 in response to the detection signal α, such as when the detection signal α indicates the building state has changed from the occupied state to the unoccupied state and vice versa. For example, the controller 18 can output a control signal β to turn on the HVAC system 12 and the light 16 in response to a detection signal α indicating the building is in the occupied state, and the controller 18 can output the control signal β to turn off the HVAC system 12 and the light 16 in response to an indication that the building is in the unoccupied state.

Additionally, the control signal β output by the controller 18 can do more than control the HVAC system 12 and light 16 between on and off states depending solely on whether the building 11 is occupied or unoccupied. That is, the controller 18 can analyze the detection signal α to determine the control signal β. The control signal β can be based on the efficiency of the smart building system 10. For example, the control signal β can control a temperature setting of the HVAC system 12 (e.g., either by altering or overriding the setpoint temperature on the thermostat of the HVAC system 12) in order to allow the temperature in an area of the building 11 to increase during a warm night or decrease during a cool night 11. As a result, the HVAC system 12 can use less power during periods of time when the temperature of the building 11 can vary without making occupants uncomfortable. As another example, the control signal β can control the HVAC system 12 to open one or more barriers between the building 11 and the external environment when the temperature of the external environment is closer to the setpoint temperature than the temperature in the building 11, thereby reducing the power consumption of the HVAC system 12. As yet another example, the control signal β can reduce the amount of power provided to the fixture 14 to dim the lights 16, such as when the detection signal α indicates that an amount of ambient light is high or when the detection signal α indicates that the time is after working hours in order to reduce the power consumption of the lights 16. Similarly, the control signal β can turn on the lights 16 when an occupant is detected, making the lights 16 more convenient to operate.

Further, if the detection signal α includes signals from multiple types of sensors making up the sensor 20, the controller 18 analyzes the detection signal α to determine the control signal β. For example, if the sensor 20 includes a clock and a motion sensor, the controller 18 can be configured to output the control signal β based on the detection signal α output by the clock portion of the sensor 20 on weekdays (e.g., to reduce the power supplied to the HVAC system 12 and/or the lights 16 after working hours) and based on the detection signal α output by the motion sensor portion of the sensor 20 on weekends (e.g., to provide power to the HVAC system 12 and/or the lights 16 when the building is in the occupied state). As another example, if the sensor 20 includes a voice-activated sensor and a keypad, the controller 18 can be configured to output the control signal β based on the signal output by the voice-activated portion of the sensor 20 and not based on the keypad portion of the sensor 20 when warranted by the signal detected by the voice-activated portion of the sensor 20 (e.g., the controller 18 can send the control signal β to eliminate power to the light 16 in an area of the building 11 in response to a detection signal α corresponding to a command similar to "Turn off the lights" detected by the voice-activated portion of the sensor 20 even though the keypad portion of the sensor 20 indicates one or more people are present in the area of the building 11).

The controller 18 can also analyze the detection signal α to determine likely future areas people will occupy and output the control signal β accordingly. For example, if the controller 18 receives a detection signal α indicating that a keypad portion of the sensor 20 detects actuation of a keypad outside a door at one end of a hallway, the controller 18 can control the HVAC system 12 and/or the lights 16 in the hallway and in rooms adjacent to the hallway in anticipation of those rooms being occupied. As another example, if the controller 18 receives a detection signal α indicating that a motion sensor portion of a sensor 20 detects the presence of motion outside a main entry to the building 11, the controller 18 can control lights 16 in a lobby.

As another example of operation of the smart building system 10, if the sensor 20 includes a power supply monitor, the detection signal α can indicate an amount of power used by the building 11 or certain systems of the building (e.g., an amount of power used in the aggregate by the HVAC system 12 and the light 16). Alternatively, instead of receiving the detection signal α expressly indicating an amount of power used by the building 11, the controller 18 can estimate the building power usage based on, e.g., the time of day if the sensor 20 includes a clock, the time of year if the sensor 20 includes a calendar, the number of areas of the building 11 occupied, and/or other considerations. That is, the estimate can be based on assumptions such as the building 11 using less power at night, the building 11 using more power during cold weather, the building 11 using more power when heavily occupied, and other assumptions.

The controller 18 can analyze the power consumption of the building 11 to determine the control signal β. For example, when the power consumption is high (e.g., above a predetermined amount), the controller 18 can reduce an amount of power provided to the light 16, thereby dimming the light 16. As another example, the controller 18 can determine or estimate which spaces of the building 11 are occupied, and only provide light to those areas (or not reduce light to those areas) during times of high power consumption. The controller 18 can allow occupants to override the control signal β if the amount of light provided by the light 16 is not deemed appropriate by occupants. Similarly, the controller 18 can control the HVAC system 12 based on the power consumption of the building 11, such as by allowing the temperature in unoccupied areas of the building 11 to increase or decrease.

Thus, as explained in various examples above, the control signal β can be solely based on, partially based on, or not based on whether the building 11 is in the occupied state or unoccupied state. Among other advantages, the smart building system 10 can allow for energy efficient operation of the HVAC system 12 and the light 16 as explained in various examples above. Additionally, the controller 18 can control operation of the HVAC system 12 and light 16 without effort by occupants of the building 11, such as by eliminating the need for occupants to turn the light 16 on or off upon entering and exiting the an area of the building 11. The controller 18 can also control the HVAC system 12 and/or light 16 based on the power drawn by the building 11 to, for example, reduce the power consumption of the HVAC system 12 and/or light 16 during times of high power consumption.

Figure 3:
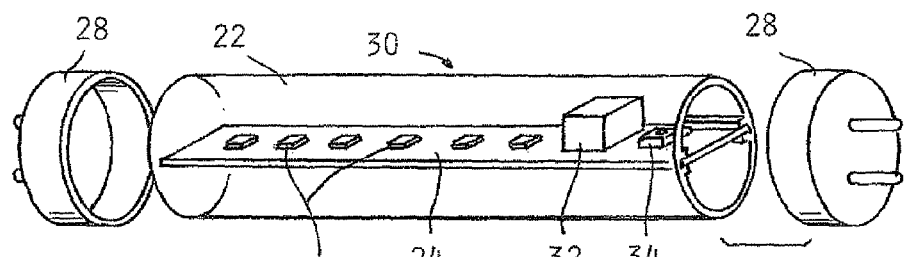
FIG. 3 is a perspective view of another example of an LED light tube.

While the light 16 in the smart building system 10 of FIG. 1 is controlled by a controller 18 separate from the light 16, another example of a light 30 as shown in FIG. 3 can include a controller 32 mounted on the circuit board 24. That is, in addition to the housing 22, circuit board 24, LEDs 26, and end caps 28, the light 30 can include the controller 32. The controller 32 can include a CPU and a memory storing a program to be executed by the CPU, and the controller 32 can be in communication with the LEDs 26 via the circuit board 24 or by other means (e.g., wires separate from the circuit board 24). Also, while the light 30 is shown and described as being shaped for compatibility with a fluorescent tube accepting fixture, the light 30 can have an alternative shape, such as an incandescent bulb or another type of light, and can use alternative sources of light, such as an incandescent, fluorescent, or halogen light.

In order to receive the detection signal $\alpha$, the light 30 can additionally include a receiver 34 mounted on the circuit board 24. The sensors 20 can be in communication with a transmitter (not shown) for transmitting the detection signal $\alpha$ to the receiver 34. For example, the receiver 34 can be in communication with the transmitter using a standard wireless protocol (e.g., a radio standard, a cellular standard such as 3G, Bluetooth, or WiFi). The receiver 34 can alternatively be in communication with the transmitter in another manner such as hardwiring or via electric signals sent through the end caps 28. The receiver 34 can also be in communication with the controller 32 (e.g., the controller 32 and receiver 34 can communicate via the circuit board 24, or the controller 32 and receiver 34 can be an integral unit), allowing the receiver 34 to communicate the detection signal $\alpha$ to the controller 32. The controller 32 can control the LEDs 26 in response to the detection signal $\alpha$ detected by the sensors 20 similar to the controller 18 controlling the light 16 described above in reference to FIG. 1.

In addition to the advantages described above with reference to the smart building system 10, integrating the receiver 34 with the light 30 of FIG. 3 can allow for easy installation of the light 30. For example, many buildings include standard fluorescent fixtures for accepting the light 30. Since the receiver 34 can be wireless, the light 30 can be installed in a standard fluorescent fixture as easily as a normal fluorescent tube.

Figure 4:
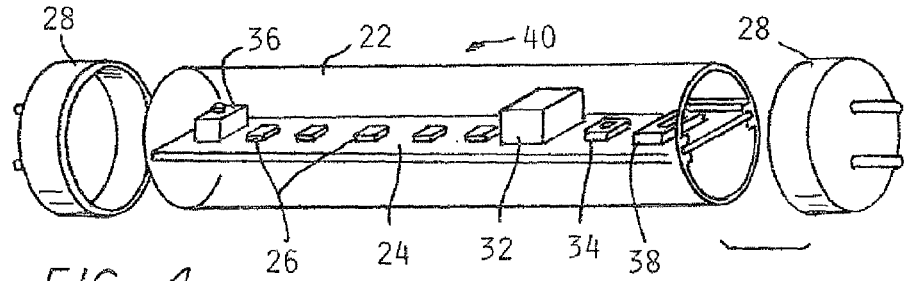
FIG. 4 is a perspective view of yet another example of an LED light tube.

While the lights 16 and 30 are described as separate from sensors 20, a light 40 as shown in FIG. 4 can include the housing 22, the circuit board 24, LEDs 26, end caps 28, the controller 32, the receiver 34, and a sensor 36 mounted on the circuit board 24. Like the sensor 20, the sensor 36 can include a motion sensor, a voice-activated sensor, a clock or calendar, an ambient light sensor, and/or another type of sensor. The sensor 36 can include multiple types of sensors for detecting different types of activities (e.g., the sensor 36 can include a clock and a motion sensor). The sensor 36 can be in communication the controller 32 via the circuit board 24 or by other means, such as being hardwired to the controller 32 or formed integrally with the controller 32. The light 40 can additionally include a transmitter 38 for communicating by way of a standard wireless protocol or other means (e.g., hardwiring) to a remote location, such as a smart building control center. The transmitter 38 can be in communication with the sensor 36 via the circuit board or by other means, such as being hard wired to the sensor 36 or formed integrally with the sensor 36.

In operation, the sensor 36 can perform detection and, in response, send the detection signal $\alpha$ to the controller 32. The controller 32 can perform at least one of a variety of functions in response to the detection signal $\alpha$. The controller 32 can control the LEDs 26 based on whether the area of the building 11 in which the light 40 is located is occupied or unoccupied. For example, a motion sensor portion of the sensor 36 can indicate whether the area of the building 11 in which the light 40 is located is occupied, and the controller 32 can turn the LEDs 26 on or off (or otherwise control the LEDs 26) based on the detection signal $\alpha$.

Further, including the transmitter 38 allows the light 40 to communicate the detection signal $\alpha$ to a remote location, such as a smart building control center that can control operation of other building systems (e.g., an HVAC system). Thus, the detection signal $\alpha$ picked up by the sensor 36 can be used as an input to control portions of a smart building other than the light 40. As an example, if the sensor 36 includes a motion detector, a smart building control center can alter the control of an HVAC system when the sensor 36 indicates a predetermined amount of time has passed since motion was last detected.

The light 40 can also include the receiver 34. Including the receiver 34 allows the controller 32 of the light 40 to control the LEDs 26 based on signals picked up from sensors 20 outside the light 40, such as a power supply sensor or a remote ambient light sensor (though an ambient light sensor integral with the light 40 can alternatively or additionally be used). The controller 32 can control the LEDs 26 in the light 40 based on, for example, a low power availability indication transmitted to the receiver 34. Thus, the controller 32 can reduce the power consumption of the LEDs 26 during times that the building 11 is using a large amount of power, when a generator is providing power, or at other times during which power should be conserved.

The above-described embodiments have been described in order to allow easy understanding of the invention and do not limit the invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed:

1. A system for use in conjunction with a conventional fluorescent light fixture that is configured to receive a standardized electrical connector of a conventional light, the system comprising:
   a sensor operable to output a first signal indicative of whether an area in a building is in an occupied state or a non-occupied state;
   an LED-based light including:
   at least one electrical connector compatible with the conventional light fixture, wherein the at least one electrical connector includes a pair of bi-pin end caps configured for engagement with the conventional fluorescent light fixture;
   multiple LEDs that output an amount of light substantially equal to an amount of light produced by a conventional fluorescent tube;
   an LED controller operable to control the multiple LEDs in response to the first signal;
   a transmitter operable to transmit a second signal indicative of whether the area is in the occupied state or the non-occupied state in response to the first signal; and
   a circuit board in electrical communication with at least one of the bi-pin end caps, wherein the multiple LEDs, the LED controller, and the transmitter are mounted on the circuit board and in electrical communication therewith; and
   a regulator controller remote from the LED-based light, operable to receive the second signal and control an environmental condition in the building in response to the second signal.

2. The system of claim 1, wherein the sensor detects one or more of motion and sound.

3. The system of claim 1, wherein the first signal is at least partially based on at least one of a time of day and a day of the week.

4. The system of claim 1, wherein the LED-based light further comprises a receiver that receives an auxiliary signal generated from a source outside the LED-based light indicative of whether the area in the building is in the occupied state or unoccupied state; and wherein the LED controller is operable to control the multiple LEDs in response to the auxiliary signal.

5. The system of claim 1, wherein the sensor is included in the LED-based light.

6. The system of claim 1, wherein the environmental condition includes at least one of a temperature setting, an airflow setting, or a humidity setting.

7. An LED-based light compatible with a standard light fixture, comprising:
- a tube including a light transmitting portion;
- a pair of electrical connectors attached to opposing ends of the tube, the pair of electrical connectors compatible with the standard fluorescent light fixture;
- a plurality of LEDs operable to produce light that passes through the light transmitting portion of the tube;
- a sensor operable to output a first signal indicative of whether an area of one or more rooms in a building is in an occupied state or a non-occupied state;
- an LED controller operable to control the plurality of LEDs in response to the first signal;
- a transmitter operable to transmit a second signal indicative of whether the area is in the occupied state or the non-occupied state in response to the first signal to a regulator controller;
- a circuit board disposed in the tube and in electrical communication with at least one of the electrical connectors, wherein the plurality of LEDs, the LED controller, and the transmitter are mounted on the circuit board,
- wherein the regulator controller is remote from the LED-based light and operable to control at least one function in the building in response to receiving the second signal and wherein the at least one function is other than controlling the LED-based light.

8. The LED-based light tube of claim 7, wherein the pair of electrical connectors include a pair of bi-pin electrical connectors.

9. The LED-based light tube of claim 7, wherein the sensor detects one or more of motion and sound.

10. The LED-based light tube of claim 7, wherein the first signal is at least partially based on at least one of a time of day and a day of the week.

11. The LED-based light tube of claim 7, further comprising a receiver that receives an auxiliary signal generated from a source outside the LED-based light indicative of whether the one or more rooms in the building are in the occupied state or unoccupied state; and wherein the LED controller is operable to control the plurality of LEDs in response to the auxiliary signal.

12. The LED-based light tube of claim 7, wherein the second signal includes an instruction to alter one or more of a temperature setting, an airflow setting, a humidity setting, and a brightness setting of the regulator controller.

13. A method for controlling an environmental condition in a building using an LED-based light according to claim 7, comprising
- receiving, by the LED controller, the first signal indicative of whether an area in a building is in the occupied state or the non-occupied state;
- controlling, by the LED controller, the plurality of LEDs in response to the first signal;
- transmitting, by the transmitter, the second signal indicative of whether the area is in the occupied state or the non-occupied state in response to the first signal to the regulator controller remote from the LED-based light; and
- controlling, by the regulator controller, at least one function in the building in response to the second signal, wherein the at least one function is other than controlling the LED-based light.

14. The method of claim 13, wherein the at least one function includes controlling at least one of a temperature setting, an airflow setting or a humidity setting in the building.

* * * * *